United States Patent
Alaria et al.

(10) Patent No.: US 10,246,948 B2
(45) Date of Patent: *Apr. 2, 2019

(54) THREADED CONNECTION HAVING HIGH GALLING RESISTANCE AND METHOD OF MAKING SAME

(71) Applicant: Pegasus S.r.l., Cirié (Turin) (IT)

(72) Inventors: Alberto Alaria, Grosso (IT); Angelo Canavera, Corio (IT)

(73) Assignee: PEGASUS S.R.L., Turin (IT)

( * ) Notice: Subject to any disclaimer, the term of this patent is extended or adjusted under 35 U.S.C. 154(b) by 221 days.

This patent is subject to a terminal disclaimer.

(21) Appl. No.: 15/265,013

(22) Filed: Sep. 14, 2016

(65) Prior Publication Data

US 2017/0009535 A1 Jan. 12, 2017

Related U.S. Application Data

(63) Continuation of application No. 14/792,077, filed on Jul. 6, 2015, now Pat. No. 9,470,044.

(51) Int. Cl.
*E21B 17/042* (2006.01)
*F16L 15/00* (2006.01)

(52) U.S. Cl.
CPC ............ *E21B 17/042* (2013.01); *F16L 15/00* (2013.01); *F16L 15/001* (2013.01); *F16L 2201/40* (2013.01)

(58) Field of Classification Search
CPC ........ E21B 17/02; F16L 15/00; F16L 2201/40
See application file for complete search history.

(56) References Cited

U.S. PATENT DOCUMENTS

| 1,817,808 A | 8/1931 | Eaton |
| 4,468,309 A | 8/1984 | White |

(Continued)

FOREIGN PATENT DOCUMENTS

| EP | 2028403 A1 | 2/2009 |
| GB | 1051095 | 12/1966 |

(Continued)

OTHER PUBLICATIONS

PCT Search Report & Written Opinion (PCT/IB2016/054051), dated Oct. 18, 2016.

(Continued)

*Primary Examiner* — James M Hewitt, II
(74) *Attorney, Agent, or Firm* — Bracewell LLP; Douglas W. Rommelmann (57) ABSTRACT

A process for treating a pin having an external threaded portion and a box having an internal threaded portion wherein the process provides a threadable joint having a high galling resistance. One embodiment of the present invention includes applying a lubricant on the threaded portion of at least one of the pin and box. The threadable joint is made up by threadably engaging the threaded portions of the pin and box to a recommended torque according to the American Petroleum Institute and then breaking out the threaded joint. The making up and breaking out step with lubricant applied on the threaded portion of at least one of the pin and box is performed a plurality of times. One of the threaded portions of the pin and box is then case hardened. The threadable joint made from this process is highly resistant to galling without the requirement of any lubricant.

20 Claims, 2 Drawing Sheets

(56) References Cited

U.S. PATENT DOCUMENTS

| | | |
|---|---|---|
| 4,474,651 A | 10/1984 | Yauchi et al. |
| 4,630,849 A | 12/1986 | Fukui et al. |
| 4,758,025 A | 7/1988 | Frick |
| 4,871,194 A | 10/1989 | Kawashima et al. |
| 5,253,902 A | 10/1993 | Petelot et al. |
| 5,409,065 A | 4/1995 | Davis |
| 5,678,608 A | 10/1997 | Fontana |
| 6,027,145 A | 2/2000 | Tsuru et al. |
| 6,679,526 B2 | 1/2004 | Yamamoto et al. |
| 6,746,057 B2 | 6/2004 | Goto et al. |
| 6,827,996 B2 | 12/2004 | Goto |
| 7,360,798 B2 | 4/2008 | Matsumoto et al. |
| 7,472,927 B2 | 1/2009 | Guise et al. |
| 7,666,266 B2 | 2/2010 | Izawa et al. |
| 7,740,285 B2 | 6/2010 | Nagasaku et al. |
| 7,866,706 B2 | 1/2011 | Goto et al. |
| 8,215,680 B2 | 7/2012 | Santi |
| 8,322,754 B2 | 12/2012 | Carcagno et al. |
| 8,420,581 B2 | 4/2013 | Goto et al. |
| 9,470,044 B1 * | 10/2016 | Alaria .................... E21B 17/042 |
| 2003/0155769 A1 | 8/2003 | Haines |
| 2009/0220780 A1 | 9/2009 | Bordet et al. |
| 2009/0236850 A1 | 9/2009 | Goto et al. |
| 2009/0316294 A1 | 12/2009 | Iwashiro |
| 2010/0059986 A1 | 3/2010 | Kimoto et al. |
| 2010/0096850 A1 | 4/2010 | Schuh et al. |
| 2011/0084477 A1 | 4/2011 | Mallis et al. |
| 2012/0169048 A1 | 7/2012 | Pinel et al. |
| 2012/0312527 A1 | 12/2012 | Pinel et al. |
| 2013/0276294 A1 | 10/2013 | Goto et al. |
| 2013/0333790 A1 | 12/2013 | Pinel et al. |
| 2014/0199135 A1 | 7/2014 | Hable et al. |
| 2014/0287161 A1 | 9/2014 | Ertas et al. |
| 2014/0308455 A1 | 10/2014 | Bordet et al. |

FOREIGN PATENT DOCUMENTS

| | | |
|---|---|---|
| JP | 60026695 A | 2/1985 |
| JP | 60116796 A | 6/1985 |
| JP | 60125391 A | 7/1985 |
| JP | 61079797 A | 4/1986 |
| JP | 61079798 A | 4/1986 |
| JP | 63270477 A | 11/1988 |
| JP | 2027088 A | 1/1990 |
| JP | 2027089 A | 1/1990 |
| JP | 5149485 B2 | 6/1993 |
| JP | 6331070 A | 11/1994 |
| JP | 6346988 A | 12/1994 |
| JP | 2001065753 A | 3/2001 |
| JP | 3340115 B2 | 3/2002 |
| JP | 4069659 B2 | 2/2003 |
| JP | 4680446 | 3/2003 |
| JP | 2006084003 A | 3/2006 |
| JP | 2006299350 A | 11/2006 |
| JP | 2011106627 A | 6/2011 |
| WO | 2002008566 A1 | 1/2002 |

OTHER PUBLICATIONS

Wood International Technical Data, http://wiegypt.com/?page_id=491 (Aug. 21, 2015).

Recommended Doping Procedure for Rotary Shouldered Connections, http://www.rigsupply.as/res/Default/rotaryconnect.pdf (Aug. 21, 2015).

American Petroleum Institute, "Recommended Practice for Drill Stem Design and Operating Limits", Addendum 1, API Recommended Practice 7G, 16th Ed. (Nov. 2003).

* cited by examiner

THREADED CONNECTION HAVING HIGH GALLING RESISTANCE AND METHOD OF MAKING SAME

CROSS-REFERENCE TO RELATED APPLICATIONS

This application is a continuation of U.S. application Ser. No. 14/792,077, filed on Jul. 6, 2015, now U.S. Pat. No. 9,470,044, entitled "Threaded Connection Having High Galling Resistance and Method of Making Same." application Ser. No. 14/792,077 is incorporated in its entirety herein.

BACKGROUND OF THE INVENTION

1. Field of the Invention

The present invention relates generally to a galling-resistant threaded connection formed of male- and female-type threaded connectors and a process for making the male- and female-type threaded connectors, and more specifically relates to a galling-resistant threaded joint for tubular components for use in connecting tubular components and particularly tubular components used for drilling and operating hydrocarbon wells.

2. Description of the Related Art

A tubular component which is "used for drilling and operating hydrocarbon wells" means any element that is substantially tubular in form intended to be connected to another element of the same type or otherwise to finally constitute either a string for drilling a hydrocarbon well or a riser intended for maintenance, such as work-over risers, or for operation, such as production risers, or for a casing string or tubing string used in the operation of wells. The invention is also applicable to components used in a drill string, such as drill pipes, heavy weight drill pipes, drill collars and the portions of pipe connections and heavy weight pipes known as tool joints.

A tool joint is a heavy coupling element for pipe, typically drill pipe, made of special alloy steel. Tool joints have coarse, tapered threads and seating shoulders designed to sustain the weight of the drill stem, withstand the strain of frequent coupling and uncoupling, and provide a leakproof seal. The male section of the joint, or the pin, is attached to one end of a length of drill pipe, and the female section, or box, is attached to the other end. The tool joint may be welded to the end of the pipe or screwed on or both. Joints of pipe are coupled together by means of tool joints.

The pin tool joint has a male (external) thread formed thereon, and the box tool joint has a female (internal) thread formed therein. A coupling or connection is formed by threadably engaging the pin tool joint of one tubular component with the box tool joint of a second tubular component. To make-up the connection, one tubular component is rotated relative to the other tubular component. To breakout the connection, the direction of relative rotation is reversed.

Today, several deep oil wells in offshore oil fields have reached depths of 20,000'-30,000' (feet). Many of the pipes and casings employed in the well are threaded tubulars having a length of approximately 30'. For example, a joint of drill pipe used to facilitate the drilling of the wellbore typically has a length of approximately thirty feet (30') or forty-five feet (45'). Thus, it is easy to see that the total string of drill pipe may comprise hundreds and possibly more than a thousand joints of pipe threaded together in some deep wells.

The oil field tubular threaded joints are subjected to tensile forces in the axial direction caused by the weight of the connected joint string and the individual joints themselves. Additionally, the threaded joints are subjected to internal and external pressures and excessive temperatures. Typically, deeper wells have higher temperatures and higher pressures than more shallow wells. The threaded connections of pipe located within the borehole exposed to these higher temperatures and/or higher pressures must withstand such severe conditions while maintaining gas tightness.

During the process of lowering tubing or casing into a well, it is sometimes necessary to breakout a pipe joint which has been made up to another tubular member, to lift the pipes out of the well, and subsequently to again make-up the connection, and then re-lower the pipe into the well. During drilling of the well, the threaded tubular components making up the drill string may have to undergo several make-up and breakout cycles. Make-up operations are generally carried out under high axial load. For example, the weight of a pipe joint thirty (30) or forty-five (45) feet long to be connected by the threaded connection may be localized by a slight misalignment of the axis of the threaded elements to be connected. This may induce a risk of galling at the threaded zones.

Traditionally, the threaded zones are protected against galling during make-up and breakout operations in the field. Initially, the threaded zones are stripped of any grease which may have been previously applied to protect against corrosion. The connection contact surfaces are cleaned and free of drilling fluids and any other contaminant residues because the solids that are present in the drilling fluids and muds can promote galling and degrade the galling resistance properties of the compound grease that is applied next. Compound grease is applied on-site to the contact surfaces of the threaded joint. The compound grease is a viscous liquid lubricant containing large amounts of powders of heavy metals such as zinc, lead, and copper. Compound grease is commonly referred to as "pipe dope." The pipe dope is applied liberally and uniformly to the entire contact surface of both the pin and box and worked into the thread roots and completely covers the shoulder surfaces. The compound grease, specified by American Petroleum Institute standards API Bulletin 5A2 or 5A3, is required to be able to impart rust prevention to the contact surface to which the compound grease was applied and also improves the thread seal and provides lubrication during the make-up of the connection.

However, when make-up of a threaded joint for pipes is carried out, compound grease which has been applied is washed off or overflows to the exterior surface, and there is the possibility of it producing harmful effects on the environment and especially on sea life, particularly due to the harmful heavy metals. Also, the process of applying compound grease worsens the working environment, and there is a concern of it having harmful effects on humans.

Thus, the step of applying the pipe dope on-site to the threaded portions takes time—time which is valuable and costly—and manpower. Additionally, the use of such compound greases, loaded with heavy and/or toxic metals such as lead, suffers from the disadvantage of causing pollution of the wells and of the environment, since excess grease is ejected from the threaded connection during make-up.

In the past, it has been proposed to carry out various types of surface treatment such as nitriding, various types of plating including zinc plating and composite plating, and phosphate chemical conversion treatment on the contact surface of a threaded joint for pipes to form one or more layers in order to increase the retention of compound grease and improve sliding properties. However, as described above, the use of compound grease poses the threat of harmful effects on the environment and humans.

It is understood in the prior art that a break-in procedure should be used for new connections in the field. Typically, this procedure comprises 2 to 3 make-ups of the connection prior to running the pipe joint. The 2 to 3 make-ups may be slow speed make-ups at 50-75% of the final running make-up torque. This practice is thought to burnish and work harden the connection surfaces prior to applying full contact stress to improve resistance to galling. However, this practice has not been found to provide lasting galling resistance.

It is desirable to have a tubular threaded joint connection that is resistant to galling and remains resistant to galling after numerous connection make-ups and breakouts. It is desirable to have a galling resistant threaded connection that does not use compound grease or other chemicals, is environmentally friendly, and saves time and manpower during the connection make-up operation. It is desirable to have a galling resistant threaded connection that can withstand high temperature exposure.

SUMMARY OF THE INVENTION

A preferred embodiment of the present invention is a tubular threaded joint connection comprising a pin tool joint and a box tool joint, each having a contact surface comprising threaded and non-threaded contact surfaces. The contact surface of one of the pin and box tool joints having a surface hardness greater than the surface hardness of the other pin or box tool joint. In use, the threaded joint connection is made-up without a lubricant or compound grease and is highly resistant to galling. In a preferred embodiment no lubrication is used when making-up the connection in the field.

One aspect of the present invention is a process used in the manufacturing of the pin and box tool joints of the tubular threaded joint connection. The internal threads of the box tool joint and the external threads of the pin tool joint are initially prepared in the manner as is customary in the industry. A lubricant, such as compound grease, is applied to the contact surfaces of one or both of the pin and box tool joints and the threaded connection is made-up and then broken out. The threaded joint is made up and broken out a plurality of times, most preferably about six (6) to ten (10) times. During each of the make-ups and breakouts, compound grease is present on the threads. Following the completion of the set of make-ups and breakouts, either the box or pin tool joint is subjected to a case hardening process such that the case hardened member will have a hardness greater than the non-case hardened member. Following this process, the tubular threaded joint connection is ready to be made up without any compound grease or other applied lubricant.

BRIEF DESCRIPTION OF THE SEVERAL VIEWS OF THE DRAWINGS

A better understanding of the present invention can be obtained when the following detailed description of the disclosed embodiments is considered in conjunction with the following drawings, in which.

DESCRIPTION OF THE PREFERRED EMBODIMENTS

One embodiment of the present invention is a process for manufacturing threaded components of a threaded coupling or connection that is highly resistant to galling even after numerous make-ups and breakouts. Additionally, the manufacturing process of the preferred embodiment results in threaded members that are highly resistant to galling without the use of a lubricant in the field. The present invention is not limited to threaded connections used in the oil field; however, the preferred embodiment is particularly useful with tubular components which are used for drilling and/or operating hydrocarbon wells. As a result, the preferred embodiment will be discussed below with reference to oil field tubular threaded joint connections.

Figure 1:
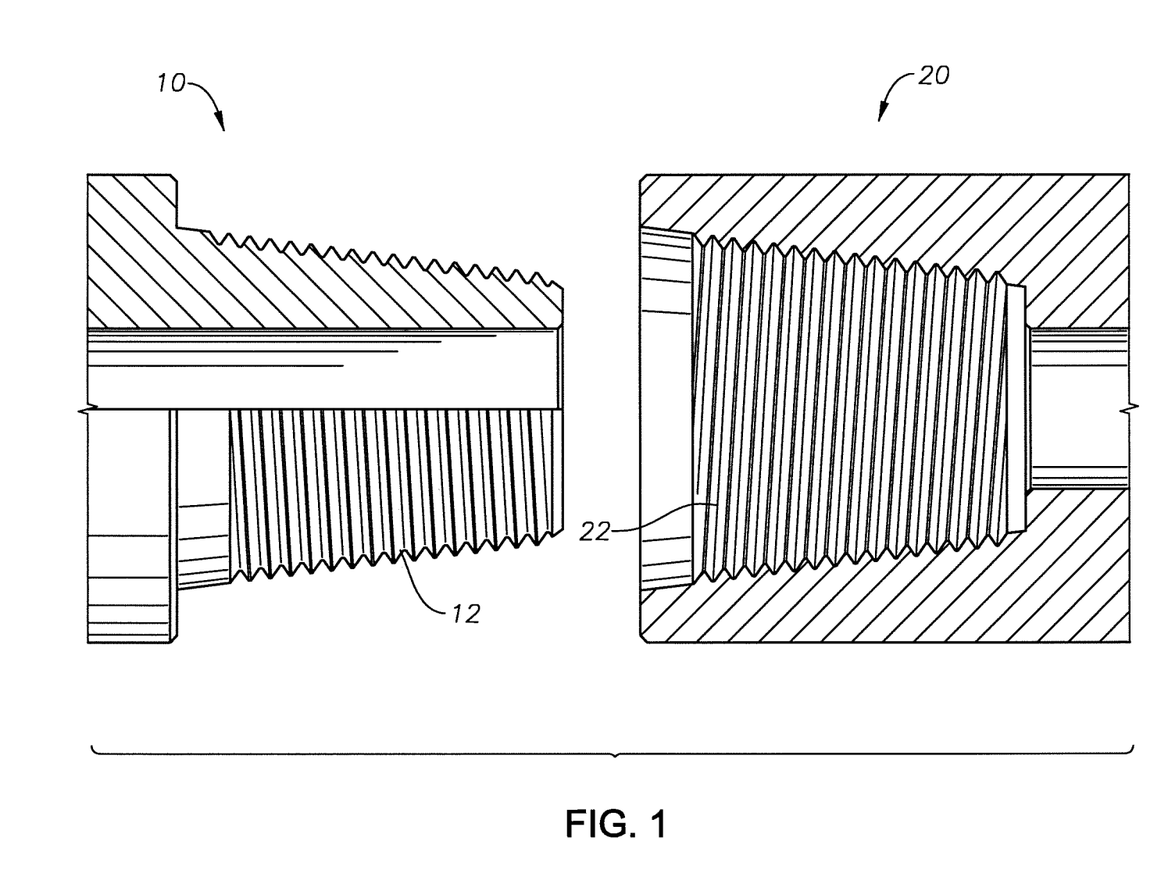
FIG. 1 is a schematic illustration of exemplary pin and box tool joints to which the present invention is applied, the box tool joint and the upper half of the pin tool joint shown in cross-section.
Figure 2:
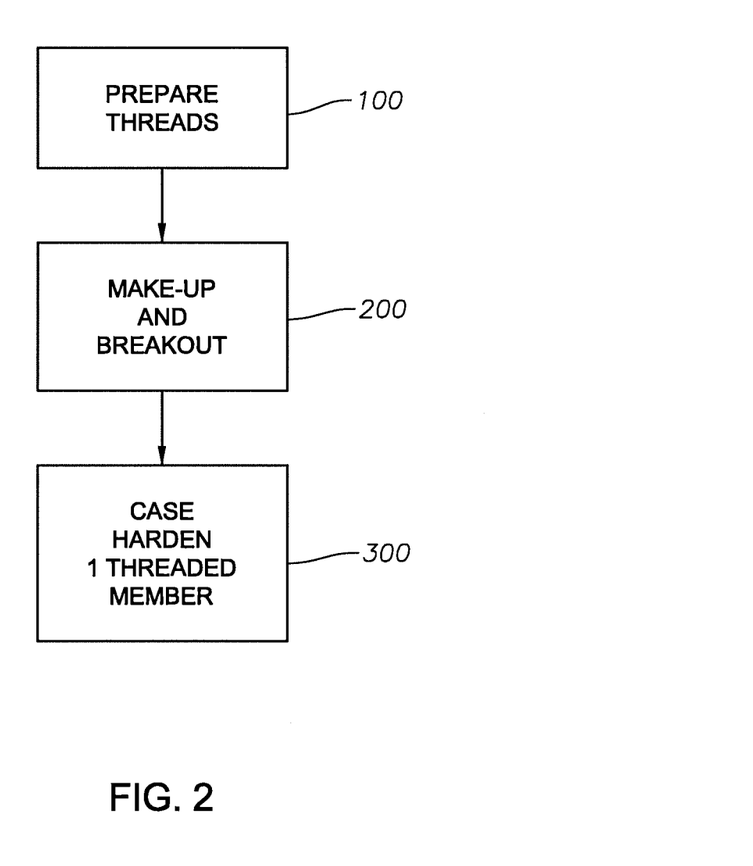
FIG. 2 is a flowchart of the process for manufacturing a galling resistant threaded connection according to a preferred embodiment of the present invention.

The process includes the step 100 of preparing threads on the end portions of members, typically tubular members. In a preferred embodiment the threads are prepared on a pin tool joint 10 and a box tool joint 20 as shown in FIG. 1. External threads 12 are prepared on the pin tool joint 10 and internal threads 22 on the box tool joint 20. The threads may be prepared in any manner as is customary in the industry. For example, the threads may be prepared by thread cutting operations which remove steel material when making the thread. Typically, tool joints have a tapered thread turned out of the tapered part of the tool joint. Even if the threads are perfectly cut, micro-vibrations and small metal crests are still present on the flanks of the threads, thus increasing local stress areas and increasing the risk of galling.

After the threads have been prepared on the tool joints 10 and 20 as discussed above, a lubricant, such as compound grease (i.e., pipe dope), is applied to the threads 12, 22 and non-threaded contact surfaces of one or both of the pin and box tool joints 10 and 20 and the threaded connection or coupling is made-up and then broken out a number of times or cycles in step 200. A standard make-up and break-out procedure is applied. The threaded joint is made up and broken out a plurality of times, preferably 3-15 times, more preferably 5-12 times, and most preferably 6-10 times, or until most of the plastic deformation has occurred. The make-up and breakout procedure induces a plastic deformation on the threads 12 and 22 such that the crests, the micro-vibrations and the surface imperfections that cutting the threads might have generated are removed or substantially minimized. After six (6) cycles of make-up and breakout of the connection most of the plastic deformation has occurred. Preferably during each of the make-ups and breakouts, compound grease is present on the threads 12 and 22. The final surfaces are therefore smoother and much less prone to galling.

In a preferred embodiment the make-up torque applied during this phase is determined based on the American Petroleum Institute Recommended Practice (API RP). The API publishes a Recommended Make-up Torque for various types of threaded connections. For example, API RP 7G—Addendum I recommends a make-up torque of 52,059 foot/pounds (ft/lbs) for a 5½" FH (full hole) connection having dimensions of 7½" OD by 3" ID, whereas an NC50 connection having dimensions of 6⅝" OD by 2¾" ID has a recommended make-up torque of 38,036 ft/lbs.

Preferably, during this step 200 of make-up/breakout cycles with pipe dope, the connection is torqued approximately to or to at least the torque recommended by API. Preferably, each joint make-up is torqued approximately to or to at least the torque recommended by API. Preferably, the standard make-up and breakout procedure comprises torquing the connection to the API recommendation, then breaking out the connection until little or no torque is present which comprises the first cycle, then making up the connection to the API recommended torque, and then breaking out until little or no torque is present which completes the second cycle. The connection is again made up to the API recommended torque, and then broken out fully to complete the third cycle. At the end of the third cycle, the pin and box are entirely unthreaded, and the joints are examined for galling prior to re-applying pipe dope to the threaded and non-threaded contact surfaces.

Following completion of the make-up and breakout cycles, one of the box and pin tool joints is subjected to a case hardening process in step 300 such that the case hardened member will have a surface hardness greater than the non-case hardened member. Alternatively, the case hardening process may be applied to the pin tool joint 10 and the box tool joint 20 but in different magnitudes on the joint members to produce differential surface hardness. Preferably, the case hardening process is only in selected areas of the pin tool joint 10 and/or the box tool joint 20, preferably the threaded region and non-threaded contact surface.

Nitriding or some other means of case hardening can be used. Nitriding is a case hardening process whereby nitrogen is introduced into the surface of the material by holding the material at a certain temperature range in a nitrogen atmosphere. Case hardening could also be done via, for example, carbonitriding, carburizing, induction hardening, laser hardening, or other similar techniques aimed at increasing the superficial hardness of the material.

Case hardening the part has two effects. First, it freezes the level of plastic deformation achieved in the previous step 200, thus making it much more difficult to further modify while being able to plastically deform small surface imperfections that could arise on the non-case hardened mating part. Secondly, it creates a hardness differential between the two parts which reportedly has a positive effect on the anti-galling properties of materials.

Preferably the hardness differential between the two mating parts should be a minimum of about 200-260 Brinell hardness points, and more preferably about 260 Brinell hardness points. For example, the case hardened part may have a Brinell number around 570-580 and the non-case hardened part a Brinell number around 310-320.

Following the case hardening process, the tubular threaded joint connection is ready to be made up and broken out without any compound grease or other applied lubricant. The order of the above steps involved in the manufacture of the threaded joint connection is important to providing a tubular joint threaded connection that is highly resistant to galling and which requires no lubricant or compound grease when in service. It is to be understood that the order of the steps does not mean however that the process of the preferred embodiment of the invention is restricted such that no other steps may be included within the process or between the above steps. For example, the pin and box tool joints 10 and 20 may be subjected to a phosphating step between step 100 and step 200. Phosphating is a process well known in the art. Additionally or alternatively, a phosphating step may also be performed on the pin and box tool joints 10 and 20 after case hardening step 300. Phosphating is commonly used to help prevent rust.

In the preferred process of manufacture, the thread surface and shape is "perfected" or "aged" prior to case hardening by making-up/breaking out the threaded connection most preferably 6-10 times, or until most of the plastic deformation has occurred. The plastic deformation smoothens the thread surface by wearing off imperfections. One "perfected" thread surface part is case-hardened to "freeze" the level of plastic deformation achieved previously and increase the hardness of the part such that it has a hardness greater than the mating threaded part.

In an alternative embodiment, step 200 may be minimized or eliminated by thread forming and thread rolling the threads on the tool joints. Thread forming is a process for creating internal threads and thread rolling is a process for creating external threads. In both of these processes, the threads are formed into the member by pressing a thread rolling die against the member. The threads are cold formed (i.e., cold forging process). As a result, materials are limited to ductile materials. Rolled/formed threads are stronger than cut threads. Processes such as thread cutting, grinding and milling remove material to produce the thread, but thread rolling/forming displaces the material with hardened steel dies. The result of moving the material grains into the shape of the thread is that the grains are denser in the root and flank portions—critical parts of the thread—improving the quality of the thread form. Additionally, the burnishing action of the steel dies produces a superior smooth finish which improves assembly between internal and external threads.

Thus, in instances where the threads have been prepared by thread rolling and thread forming, the make-up and breakout step 200 described above may be eliminated since the threads are already smooth and plastic deformation occurred during formation of the threads. Next and/or lastly, the threaded surface and non-threaded contact surface of one of the two mating members is case hardened in step 300 as described above.

In another alternative embodiment, one of the members is threaded by the thread forming or thread rolling process. For example, the external thread 12 is formed by the thread rolling process on the male member 10 and the internal thread 22 is formed by, for example, the thread cutting process on the female member 20. In one embodiment, pipe dope is applied to one or both of the threaded surfaces and non-threaded contact surfaces and the make-up and breakout step 200 is performed as described above. Next or lastly, the threaded surface and non-threaded contact surface of one of the mating male and female members, 10 and 20 respectively, is case hardened in step 300 as described above. Alternatively, in this example the case hardening step 300 may be performed prior to the make-up breakout step 200 so long as the case hardening process is to the member having the threads formed by the thread forming or thread rolling process (i.e., to the male member 10 in the above example).

In another embodiment, the threads may be made by grinding, typically performed with a grinding wheel on a grinding machine. This process can be used to produce accurate threads or threads in hard materials. If the threads are formed by grinding, the make-up and breakout cycles of step 200 may be eliminated. Another process known as thread lapping may follow thread cutting or grinding in order to achieve the highest precision and surface finish achievable. Thread lapping will also eliminate the need for step 200.

In the following series of tests, the following pin and box tool joints were manufactured by a CNC lathe using standard cutting inserts:

| | $5\frac{1}{2}$ FH | | NC50 | | NC38 | |
|---|---|---|---|---|---|---|
| | $7\frac{1}{2}''$ OD× 3" ID | | $6\frac{5}{8}''$ OD× $2\frac{3}{4}''$ ID | | 5" OD× $2\frac{1}{8}''$ ID | |
| Joint # | Box | Pin | Box | Pin | Box | Pin |
| 1 | S | H | S | H | S | H |
| 2 | H | S | H | S | H | S |
| 3 | S | H | S | H | S | H |
| 4 | S | H | S | H | S | H |
| 5 | S | H | S | H | S | H |
| 6 | S | H | S | H | S | H |
| 7 | S | H | S | H | S | H |
| 8 | S | H | S | H | S | H |
| 9 | S | H | S | H | S | H |
| 10 | S | H | S | H | S | H |

"H" means case hardened and "S" means not case hardened.

The tool joints were made from carbon steel type AISI 4137H, a classic material for tool joints. The threads of the box and pin tool joints were formed by similar techniques for all the joint numbers and each of the three API-type connections. The API-type connections are 5½ FH, NC50 and NC38. Ten (10) boxes and pins of each API-type connection were manufactured in accordance with the following procedure for testing purposes.

The pin and box of each joint number for each API-type connection were made up with each other and broken out nine (9) times (i.e., 9 cycles). The make-up torque for each cycle was the API recommended torque for the API-type connection. For example, the API recommended make-up torque for 5½ FH (dimensions: 7½" OD×3" ID) is 52,059 ft/lbs. The make-up torque for each of the nine (9) cycles of each of the 5½ FH joints was 52,059 ft/lbs. The API recommended make-up torque for NC50 (dimensions: 6⅝" OD×2¾" ID) is 38,036 ft/lbs. The make-up torque for each of the nine (9) cycles of each of the NC50 joints was 38,036 ft/lbs. Lastly, the API recommended make-up torque for NC38 (dimensions: 5" OD×2⅛" ID) is 15,902 ft/lbs. The make-up torque for each of the nine (9) cycles of each of the NC38 joints was 15,902 ft/lbs.

The following three (3) series of nine (9) tests were conducted employing the pin and box tool joints manufactured in accordance with the above process of a preferred embodiment of the present invention. Each series of nine (9) tests involved a different API-type connection.

Definitions

"New" means a connector (pin or box tool joint) that has not been made up and broken out prior to the beginning of the trial other than during the manufacturing process;

"Used" means a connector (pin or box tool joint) that has been made up and broken out without any lubricant or compound grease prior to the beginning of the trial;

"H" means case hardened; and

"S" means not case hardened.

A. Series of Testing with 5½" FH Connection

Connection type: 5½" FH (full hole); Dimensions: 7½" OD by 3" ID. Recommended make-up torque as per API RP 7G—Addendum I: 52059 ft/lbs. Tests were conducted in a series of make and break procedures as per the below tables. Tests stopped at 85000 ft/lbs because of make and break machine torque limits.

Trial 1A—Purpose of the Test: Verify Galling Occurrence on Threads.

Box #1 (New-S) and Pin #1 (New-H).

| Target make-up torque (ft/lbs) | Number of cycles | Breakout torque (ft/lbs) | Galling or visible thread wear or damage |
|---|---|---|---|
| 30000 | 5 | <30000 | No |
| 35000 | 5 | <35000 | No |
| 40000 | 5 | <40000 | No |
| 45000 | 5 | <45000 | No |
| 50000 | 5 | <50000 | No |
| 52059 | 10 | <52059 | No |
| 55000 | 10 | <55000 | No |
| 60000 | 10 | <60000 | No |
| 65000 | 10 | <65000 | No |
| 70000 | 10 | <70000 | No |
| 75000 | 20 | <75000 | No |
| 80000 | 20 | <80000 | No |
| 85000 | 35 | <85000 | No |
| Total No. of cycles | 150 | | |

In Trial 1A, a new case hardened pin tool joint and a new box tool joint were used. The pin and box tool joints (i.e., Pin #1 and Box #1) had been originally made up and broken out with each other with compound grease during the manufacturing process of the tool joints. Initially, 5 make-up and breakout cycles were conducted with a target make-up torque of 30,000 ft/lbs. In each case the breakout torque was less than the target make-up torque of 30,000 ft/lbs. The pin and box tool joint threads were visually inspected after each set of cycles at a target make-up torque for detection of galling, thread wear and damage and the result recorded. The next 5 cycles were conducted with a target make-up torque of 35,000 ft/lbs. and so forth until the final 35 cycles were conducted with a target make-up torque of 85,000 ft/lbs. After the completion of the 150 total cycles with the same pin and box tool joints without using any compound grease, the breakout torque was always less than the target make-up torque and there was no visual detection of galling, thread wear or damage to the threaded zones of the tool joints.

Trial 2A—Purpose of the Test: Verify Galling Occurrence on Threads.

Box #2 (New-H) and Pin #2 (New-S).

| Target make-up torque (ft/lbs) | Number of cycles | Breakout torque (ft/lbs) | Galling, visible thread wear or damage |
|---|---|---|---|
| 52059 | 15 | <52059 | No |
| 55000 | 15 | <55000 | No |
| 60000 | 15 | <60000 | No |
| 65000 | 15 | <65000 | No |
| 70000 | 25 | <70000 | No |
| 75000 | 25 | <75000 | No |
| 80000 | 25 | <80000 | No |
| 85000 | 25 | <85000 | No |
| Total No. of cycles | 160 | | |

In Trial 2A, the pin and box tool joints were again both new but the box tool joint was case hardened as opposed to the pin tool joint. Similar to Trial 1A, the pin and box tool joints (i.e., Pin #2 and Box #2) had been originally made up and broken out with each other with compound grease during the manufacturing process of the tool joints. The tests began with 15 cycles at the API recommended make-up torque of 52,059 ft/lbs. following the same practice as in Trial 1A. After the completion of 160 total cycles with the same pin and box tool joints without using any compound grease, the breakout torque was always less than the target make-up torque and there was no visual detection of galling, thread wear or damage to the threaded zones of the tool joints.

Trial 3A—Purpose of the Test: Interchangeability of Used Box with Used Pin.

Box #3 (Used-S) and Pin #4 (Used-H).

| Target make-up torque (ft/lbs) | Number of cycles | Breakout torque (ft/lbs) | Galling, visible thread wear or damage |
|---|---|---|---|
| 52059 | 5 | <52059 | No |
| 55000 | 5 | <55000 | No |
| 60000 | 5 | <60000 | No |
| 65000 | 5 | <65000 | No |
| 70000 | 5 | <70000 | No |
| 75000 | 5 | <75000 | No |
| 80000 | 5 | <80000 | No |
| 85000 | 5 | <85000 | No |
| Total No. of cycles | 40 | | |

Although Box #3 and Pin #4 were both "used" at the beginning of Trial 3A, they had not previously been used with each other, including during manufacture. After the completion of 40 total cycles with the same pin and box tool joints without using any compound grease, the breakout torque was always less than the target make-up torque and there was no visual detection of galling, thread wear or damage to the threaded zones of the tool joints.

Trial 4A—Purpose of the Test: Interchangeability of Used Box with Used Pin.

Trial 3A was repeated using Box #4 (Used-S) and Pin #3 (Used-H). Although Box #4 and Pin #3 were both "used," they had not previously been used with each other, including during manufacture. Trial 4A had the same results as Trial 3A.

Trials 3A and 4A showed the interchangeability of the pin and box tool joints in the case of used—used tool joints.

Trial 5A—Purpose of the Test: Interchangeability of Used Box with New Pins.

Box #3 (Used-S) and Pin #5 (New-H);
Box #3 (Used-S) and Pin #6 (New-H); and
Box #3 (Used-S) and Pin #7 (New-H).

| | Target make-up torque (ft/lbs) | Number of cycles | Breakout torque (ft/lbs) | Galling, visible thread wear or damage |
|---|---|---|---|---|
| Box #3/Pin #5 | 52059 | 10 | <52059 | No |
| Box #3/Pin #6 | 52059 | 10 | <52059 | No |
| Box #3/Pin #7 | 52059 | 10 | <52059 | No |

In Trial 5A, a used box tool joint was used with three new case hardened pin tool joints. Each cycle included the API recommended make-up torque as the target make-up torque. After the completion of 10 total cycles with each new pin tool joint without using any compound grease, the breakout torque was always less than the target make-up torque and there was no visual detection of galling, thread wear or damage to the threaded zones of any of the tool joints.

Trial 6A—Purpose of the Test: Interchangeability of Used Box with New Pins.

Box #4 (Used-S) and Pin #8 (New-H);
Box #4 (Used-S) and Pin #9 (New-H); and
Box #4 (Used-S) and Pin #10 (New-H).

Trial 5A was repeated using Box #4 (Used-S) and Pin ##8, 9 and 10 (New-H). The same sequence of make-up, breakout and cycles were performed as in Trial 5A. Trial 6A had the same results as Trial 5A.

Trials 5A and 6A showed the ability to use a used box tool joint with new pin tool joints.

Trial 7A—Purpose of the Test: Interchangeability of Used Pin with New Boxes.

Pin #3 (Used-H) and Box #5 (New-S);
Pin #3 (Used-H) and Box #6 (New-S); and
Pin #3 (Used-H) and Box #7 (New-S).

| | Target make-up torque (ft/lbs) | Number of cycles | Breakout torque (ft/lbs) | Galling, visible thread wear or damage |
|---|---|---|---|---|
| Pin #3/Box #5 | 52059 | 10 | <52059 | No |
| Pin #3/Box #6 | 52059 | 10 | <52059 | No |
| Pin #3/Box #7 | 52059 | 10 | <52059 | No |

In Trial 7A, a used case hardened pin tool joint was used with three new box tool joints. Each cycle included the API recommended make-up torque as the target make-up torque. After the completion of 10 total cycles with each new box tool joint without using any compound grease, the breakout torque was always less than the target make-up torque and there was no visual detection of galling, thread wear or damage to the threaded zones of any of the tool joints.

Trial 8A—Purpose of the Test: Interchangeability of Used Pin with New Boxes.

Pin #4 (Used-H) and Box #8 (New-S);
Pin #4 (Used-H) and Box #9 (New-S); and
Pin #4 (Used-H) and Box #10 (New-S).

Trial 7A was repeated using Pin #4 (Used-H) and Box ##8, 9 and 10 (New-S). The same sequence of make-up, breakout and cycles were performed as in Trial 7A. Trial 8A had the same results as Trial 7A.

Trials 7A and 8A showed the ability to use a used pin tool joint with new box tool joints.

Trial 9A—Purpose of the Test: General Interchangeability of Tool Joints (Irrespective of past Make-ups and Breakouts).

Pin #6 (Used-H) and Box #7 (Used-S).

| Target make-up torque (ft/lbs) | Number of cycles | Breakout torque (ft/lbs) | Galling, visible thread wear or damage |
|---|---|---|---|
| 52059 | 5 | <52059 | No |
| 55000 | 5 | <55000 | No |
| 60000 | 5 | <60000 | No |
| 65000 | 5 | <65000 | No |
| 70000 | 5 | <70000 | No |
| 75000 | 5 | <75000 | No |
| 80000 | 5 | <80000 | No |
| 85000 | 5 | <85000 | No |
| Total No. of cycles | 40 | | |

In Trial 9A, although Box #7 and Pin #6 were both "used" at the beginning of Trial 9A, they had not previously been used with each other, including during manufacture.

After the completion of 40 total cycles with the same pin and box tool joints without using any compound grease, the breakout torque was always less than the target make-up torque and there was no visual detection of galling, thread wear or damage to the threaded zones of the tool joints. Trial 9A showed the interchangeability of using used pin and box tool joints irrespective of their previous make-up and breakout procedures.

B. Series of Testing with NC50 Connection

Connection type: NC50; Dimensions: 6⅝" OD by 2¾" ID. Recommended make-up torque as per API RP 7G—Addendum I: 38036 ft/lbs. Tests were conducted in a series of make and break procedures as per the below tables. Tests stopped at 85000 ft/lbs because of make and break machine torque limits.

Trial 1B—Purpose of the Test: Verify Galling Occurrence on Threads.

Box #1 (New-S) and Pin #1 (New-H).

| Target make-up torque (ft/lbs) | Number of cycles | Breakout torque (ft/lbs) | Galling or visible thread wear or damage |
|---|---|---|---|
| 15000 | 5 | <15000 | No |
| 20000 | 5 | <20000 | No |
| 25000 | 5 | <25000 | No |
| 30000 | 5 | <30000 | No |
| 35000 | 5 | <35000 | No |
| 38036 | 10 | <38036 | No |
| 40000 | 10 | <40000 | No |
| 50000 | 10 | <50000 | No |
| 65000 | 10 | <65000 | No |
| 70000 | 10 | <70000 | No |
| 75000 | 20 | <75000 | No |
| 80000 | 20 | <80000 | No |
| 85000 | 35 | <85000 | No |
| Total No. of cycles | 150 | | |

In Trial 1BA, a new case hardened pin tool joint and a new box tool joint were used. The pin and box tool joints (i.e., Pin #1 and Box #1) had been originally made up and broken out with each other with compound grease during the manufacturing process of the tool joints. Initially, 5 make-up and breakout cycles were conducted with a target make-up torque of 15,000 ft/lbs. In each case the breakout torque was less than the target make-up torque of 15,000 ft/lbs. The pin and box tool joint threads were visually inspected after each set of cycles at a target make-up torque for detection of galling, thread wear and damage and the result recorded. The next 5 cycles were conducted with a target make-up torque of 20,000 ft/lbs. and so forth until the final 35 cycles were conducted with a target make-up torque of 85,000 ft/lbs. After the completion of the 150 total cycles with the same pin and box tool joints without using any compound grease, the breakout torque was always less than the target make-up torque and there was no visual detection of galling, thread wear or damage to the threaded zones of the tool joints.

Trial 2B—Purpose of the Test: Verify Galling Occurrence on Threads.

Box #2 (New-H) and Pin #2 (New-S).

| Target make-up torque (ft/lbs) | Number of cycles | Breakout torque (ft/lbs) | Galling, visible thread wear or damage |
|---|---|---|---|
| 38036 | 15 | <38036 | No |
| 40000 | 15 | <40000 | No |
| 45000 | 15 | <45000 | No |
| 50000 | 15 | <50000 | No |
| 60000 | 25 | <60000 | No |
| 70000 | 25 | <70000 | No |
| 80000 | 25 | <80000 | No |
| 85000 | 25 | <85000 | No |
| Total No. of cycles | 160 | | |

In Trial 2B, the pin and box tool joints were again both new but the box tool joint was case hardened as opposed to the pin tool joint. Similar to Trial 2A, the pin and box tool joints (i.e., Pin #2 and Box #2) had been originally made up and broken out with each other with compound grease during the manufacturing process of the tool joints. The tests began with 15 cycles at the API recommended make-up torque of 38,036 ft/lbs. following the same practice as in Trial 2A. After the completion of 160 total cycles with the same pin and box tool joints without using any compound grease, the breakout torque was always less than the target make-up torque and there was no visual detection of galling, thread wear or damage to the threaded zones of the tool joints.

Trial 3B—Purpose of the Test: Interchangeability of Used Box with Used Pin.

Box #3 (Used-S) and Pin #4 (Used-H).

| Target make-up torque (ft/lbs) | Number of cycles | Breakout torque (ft/lbs) | Galling, visible thread wear or damage |
|---|---|---|---|
| 38036 | 5 | <38036 | No |
| 40000 | 5 | <40000 | No |
| 45000 | 5 | <45000 | No |
| 50000 | 5 | <50000 | No |
| 60000 | 5 | <60000 | No |
| 70000 | 5 | <70000 | No |
| 80000 | 5 | <80000 | No |
| 85000 | 5 | <85000 | No |
| Total No. of cycles | 40 | | |

Although Box #3 and Pin #4 were both "used" at the beginning of Trial 3B, they had not previously been used with each other, including during manufacture. After the completion of 40 total cycles with the same pin and box tool joints without using any compound grease, the breakout torque was always less than the target make-up torque and there was no visual detection of galling, thread wear or damage to the threaded zones of the tool joints.

Trial 4B—Purpose of the Test: Interchangeability of Used Box with Used Pin.

Trial 3B was repeated using Box #4 (Used-S) and Pin #3 (Used-H). Although Box #4 and Pin #3 were both "used," they had not previously been used with each other. Trial 4B had the same results as Trial 3B.

Trials 3B and 4B showed the interchangeability of the pin and box tool joints in the case of used—used tool joints.

Trial 5B—Purpose of the Test: Interchangeability of Used Box with New Pins.

Box #3 (Used-S) and Pin #5 (New-H);
Box #3 (Used-S) and Pin #6 (New-H); and
Box #3 (Used-S) and Pin #7 (New-H).

|  | Target make-up torque (ft/lbs) | Number of cycles | Breakout torque (ft/lbs) | Galling, visible thread wear or damage |
| --- | --- | --- | --- | --- |
| Box #3/Pin #5 | 38036 | 10 | <38036 | No |
| Box #3/Pin #6 | 38036 | 10 | <38036 | No |
| Box #3/Pin #7 | 38036 | 10 | <38036 | No |

In Trial 5B, a used box tool joint was used with three new case hardened pin tool joints. Each cycle included the API recommended make-up torque as the target make-up torque. After the completion of 10 total cycles with each new pin tool joint without using any compound grease, the breakout torque was always less than the target make-up torque and there was no visual detection of galling, thread wear or damage to the threaded zones of any of the tool joints.

Trial 6B—Purpose of the Test: Interchangeability of Used Box with New Pins.

Box #4 (Used-S) and Pin #8 (New-H);
Box #4 (Used-S) and Pin #9 (New-H); and
Box #4 (Used-S) and Pin #10 (New-H).

Trial 5B was repeated using Box #4 (Used-S) and Pin ##8, 9 and 10 (New-H). The same sequence of make-up, breakout and cycles were performed as in Trial 5B. Trial 6B had the same results as Trial 5B.

Trials 5B and 6B showed the ability to use a used box tool joint with new pin tool joints.

Trial 7B—Purpose of the Test: Interchangeability of Used Pin with New Boxes.

Pin #3 (Used-H) and Box #5 (New-S);
Pin #3 (Used-H) and Box #6 (New-S); and
Pin #3 (Used-H) and Box #7 (New-S).

|  | Target make-up torque (ft/lbs) | Number of cycles | Breakout torque (ft/lbs) | Galling, visible thread wear or damage |
| --- | --- | --- | --- | --- |
| Pin #3/Box #5 | 38036 | 10 | <38036 | No |
| Pin #3/Box #6 | 38036 | 10 | <38036 | No |
| Pin #3/Box #7 | 38036 | 10 | <38036 | No |

In Trial 7B, a used case hardened pin tool joint was used with three new box tool joints. Each cycle included the API recommended make-up torque as the target make-up torque. After the completion of 10 total cycles with each new box tool joint without using any compound grease, the breakout torque was always less than the target make-up torque and there was no visual detection of galling, thread wear or damage to the threaded zones of any of the tool joints.

Trial 8B—Purpose of the Test: Interchangeability of Used Pin with New Boxes.

Pin #4 (Used-H) and Box #8 (New-S);
Pin #4 (Used-H) and Box #9 (New-S); and
Pin #4 (Used-H) and Box #10 (New-S).

Trial 7B was repeated using Pin #4 (Used-H) and Box ##8, 9 and 10 (New-S). The same sequence of make-up, breakout and cycles were performed as in Trial 7B. Trial 8B had the same results as Trial 7B.

Trials 7B and 8B showed the ability to use a used pin tool joint with new box tool joints.

Trial 9B—Purpose of the Test: General Interchangeability of Tool Joints (Irrespective of past Make-ups and Breakouts).

Pin #5 (Used-H) and Box #9 (Used-S).

| Target make-up torque (ft/lbs) | Number of cycles | Breakout torque (ft/lbs) | Galling, visible thread wear or damage |
| --- | --- | --- | --- |
| 38036 | 5 | <38036 | No |
| 40000 | 5 | <40000 | No |
| 45000 | 5 | <45000 | No |
| 50000 | 5 | <50000 | No |
| 60000 | 5 | <60000 | No |
| 70000 | 5 | <70000 | No |
| 80000 | 5 | <80000 | No |
| 85000 | 5 | <85000 | No |
| Total No. of cycles | 40 | | |

In Trial 9B, although Box #9 and Pin #5 were both "used" at the beginning of Trial 9B, they had not previously been used with each other, including during manufacture.

After the completion of 40 total cycles with the same pin and box tool joints without using any compound grease, the breakout torque was always less than the target make-up torque and there was no visual detection of galling, thread wear or damage to the threaded zones of the tool joints. Trial 9A showed the interchangeability of using used pin and box tool joints irrespective of their previous make-up and breakout procedures.

C. Series of Testing with NC38 Connection.

Connection type: NC38; Dimensions: 5" OD by 2⅛" ID. Recommended make-up torque as per API RP 7G—Addendum I: 15902 ft/lbs. Test were conducted in a series of make and break procedures as per the below tables.

Trial 1C—Purpose of the Test: Verify Galling Occurrence on Threads.

Box #1 (New-S) and Pin #1 (New-H).

| Target make-up torque (ft/lbs) | Number of cycles | Breakout torque (ft/lbs) | Galling or visible thread wear or damage |
| --- | --- | --- | --- |
| 10000 | 5 | <10000 | No |
| 15000 | 10 | <15000 | No |
| 15902 | 15 | <15902 | No |
| 20000 | 15 | <20000 | No |
| 25000 | 15 | <25000 | No |
| 30000 | 15 | <30000 | No |
| 35000 | 15 | <35000 | No |
| 40000 | 15 | <40000 | No |
| 45000 | 15 | <45000 | No |
| 50000 | 15 | <50000 | No |
| 53275* | 1 | N/A | N/A |
| Total No. of cycles | 136 | | |

*pin failure occurred while making up to 55000 ft/lbs.

In Trial 1C, a new case hardened pin tool joint and a new box tool joint were used. The pin and box tool joints (i.e., Pin #1 and Box #1) had been originally made up and broken out with each other with compound grease during the manufacturing process of the tool joints. Initially, 5 make-up and breakout cycles were conducted with a target make-up torque of 10,000 ft/lbs. In each case the breakout torque was less than the target make-up torque of 10,000 ft/lbs. The pin and box tool joint threads were visually inspected after each set of cycles at a target make-up torque for detection of galling, thread wear and damage and the result recorded. The next 10 cycles were conducted with a target make-up torque of 15,000 ft/lbs. and so forth until the pin failed at 53,275 ft/lbs while making up to 55,000 ft/lbs. The case-hardened Pin #1 was truncated at the height of the third thread due to excess tension above the ultimate tensile strength of the thread section. After the completion of the 135 total cycles with the same pin and box tool joints without using any compound grease, the breakout torque was always less than the target make-up torque and there was no visual detection of galling, thread wear or damage to the threaded zones of the tool joints. Additionally, galling did not occur even when the limit of the material was reached.

Trial 2C—Purpose of the Test: Verify Galling Occurrence on Threads.

Box #2 (New-H) and Pin #2 (New-S).

| Target make-up torque (ft/lbs) | Number of cycles | Breakout torque (ft/lbs) | Galling or visible thread wear or damage |
|---|---|---|---|
| 15902 | 15 | <15902 | No |
| 20000 | 15 | <20000 | No |
| 25000 | 15 | <25000 | No |
| 30000 | 15 | <30000 | No |
| 35000 | 25 | <35000 | No |
| 40000 | 25 | <40000 | No |
| 45000 | 25 | <45000 | No |
| 50000 | 15 | <50000 | No |
| Total No. of cycles | 150 | | |

In Trial 2C, the pin and box tool joints were again both new but the box tool joint was case hardened as opposed to the pin tool joint. Similar to Trial 1C, the pin and box tool joints (i.e., Pin #2 and Box #2) had been originally made up and broken out with each other with compound grease during the manufacturing process of the tool joints. The tests began with 15 cycles at the API recommended make-up torque of 15,902 ft/lbs. following the same practice as in Trial 1C. A decision was made not to torque above 50,000 ft/lbs in order to avoid pin failure. After the completion of 150 total cycles with the same pin and box tool joints without using any compound grease, the breakout torque was always less than the target make-up torque and there was no visual detection of galling, thread wear or damage to the threaded zones of the tool joints.

Trial 3C—Purpose of the Test: Interchangeability of Used Box with Used Pin.

Box #3 (Used-S) and Pin #4 (Used-H).

| Target make-up torque (ft/lbs) | Number of cycles | Breakout torque (ft/lbs) | Galling or visible thread wear or damage |
|---|---|---|---|
| 15902 | 5 | <15902 | No |
| 20000 | 5 | <20000 | No |
| 25000 | 5 | <25000 | No |
| 30000 | 5 | <30000 | No |
| 35000 | 5 | <35000 | No |
| 40000 | 5 | <40000 | No |
| 45000 | 5 | <45000 | No |
| 50000 | 5 | <50000 | No |
| Total No. of cycles | 40 | | |

Although Box #3 and Pin #4 were both "used" at the beginning of Trial 3C, they had not previously been used with each other, including during manufacture. After the completion of 40 total cycles with the same pin and box tool joints without using any compound grease, the breakout torque was always less than the target make-up torque and there was no visual detection of galling, thread wear or damage to the threaded zones of the tool joints.

Trial 4C—Purpose of the Test: Interchangeability of Used Box with Used Pin.

Trial 3C was repeated using Box #4 (Used-S) and Pin #3 (Used-H). Although Box #4 and Pin #3 were both "used," they had not previously been used with each other. Trial 4C had the same results as Trial 3C.

Trials 3C and 4C showed the interchangeability of the pin and box tool joints in the case of used—used tool joints.

Trial 5C—Purpose of the Test: Interchangeability of Used Box with New Pins.

Box #3 (Used-S) and Pin #5 (New-H);
Box #3 (Used-S) and Pin #6 (New-H); and
Box #3 (Used-S) and Pin #7 (New-H).

| | Target make-up torque (ft/lbs) | Number of cycles | Breakout torque (ft/lbs) | Galling, visible thread wear or damage |
|---|---|---|---|---|
| Box #3/Pin #5 | 15902 | 10 | <15902 | No |
| Box #3/Pin #6 | 15902 | 10 | <15902 | No |
| Box #3/Pin #7 | 15902 | 10 | <15902 | No |

In Trial 5C, a used box tool joint was used with three new case hardened pin tool joints. Each cycle included the API recommended make-up torque as the target make-up torque. After the completion of 10 total cycles with each new pin tool joint without using any compound grease, the breakout torque was always less than the target make-up torque and there was no visual detection of galling, thread wear or damage to the threaded zones of any of the tool joints.

Trial 6C—Purpose of the Test: Interchangeability of Used Box with New Pins.

Box #4 (Used-S) and Pin #8 (New-H);
Box #4 (Used-S) and Pin #9 (New-H); and
Box #4 (Used-S) and Pin #10 (New-H).

Trial 5C was repeated using Box #4 (Used-S) and Pin ##8, 9 and 10 (New-H). The same sequence of make-up, breakout and cycles were performed as in Trial 5C. Trial 6C had the same results as Trial 5C.

Trials 5C and 6C showed the ability to use a used box tool joint with new pin tool joints.

Trial 7C—Purpose of the Test: Interchangeability of Used Pin with New Boxes.

Pin #3 (Used-H) and Box #5 (New-S);
Pin #3 (Used-H) and Box #6 (New-S); and
Pin #3 (Used-H) and Box #7 (New-S).

| | Target make-up torque (ft/lbs) | Number of cycles | Breakout torque (ft/lbs) | Galling, visible thread wear or damage |
|---|---|---|---|---|
| Pin #3/Box #5 | 15902 | 10 | <15902 | No |
| Pin #3/Box #6 | 15902 | 10 | <15902 | No |
| Pin #3/Box #7 | 15902 | 10 | <15902 | No |

In Trial 7C, a used case hardened pin tool joint was used with three new box tool joints. Each cycle included the API recommended make-up torque as the target make-up torque. After the completion of 10 total cycles with each new box tool joint without using any compound grease, the breakout torque was always less than the target make-up torque and there was no visual detection of galling, thread wear or damage to the threaded zones of any of the tool joints.

Trial 8C—Purpose of the Test: Interchangeability of Used Pin with New Boxes.

Pin #4 (Used-H) and Box #8 (New-S);
Pin #4 (Used-H) and Box #9 (New-S); and
Pin #4 (Used-H) and Box #10 (New-S).

Trial 7C was repeated using Pin #4 (Used-H) and Box ##8, 9 and 10 (New-S). The same sequence of make-up, breakout and cycles were performed as in Trial 7C. Trial 8C had the same results as Trial 7C.

Trials 7C and 8C showed the ability to use a used pin tool joint with new box tool joints.

Trial 9C—Purpose of the test: General Interchangeability of Tool Joints (irrespective of past Make-ups and Break-outs).

Pin #8 (Used-H) and Box #10 (Used-S).

| Target make-up torque (ft/lbs) | Number of cycles | Breakout torque (ft/lbs) | Galling or visible thread wear or damage |
|---|---|---|---|
| 15902 | 5 | <15902 | No |
| 20000 | 5 | <20000 | No |
| 25000 | 5 | <25000 | No |
| 30000 | 5 | <30000 | No |
| 35000 | 5 | <35000 | No |
| 40000 | 5 | <40000 | No |
| 45000 | 5 | <45000 | No |
| 50000 | 5 | <50000 | No |
| Total No. of cycles | 40 | | |

In Trial 9C, although Box #10 and Pin #8 were both "used" at the beginning of Trial 9C, they had not previously been used with each other, including during manufacture.

After the completion of 40 total cycles with the same pin and box tool joints without using any compound grease, the breakout torque was always less than the target make-up torque and there was no visual detection of galling, thread wear or damage to the threaded zones of the tool joints. Trial 9C showed the interchangeability of using used pin and box tool joints irrespective of their previous make-up and break-out procedures.

The preferred embodiment of the present invention provides several benefits and advantages over the prior art including, but not limited to:

No galling;
Extremely durable—no lubricant (chemical) coating/layer on threads;
Environmentally friendly—clean;
Chemical-free;
Dope-free;
Withstands high temperature exposure;
No deposition of material layer on threads—minimizes process steps to form threaded connector;
Thermal stability;
Increased friction factor due to metal to metal contact;
No manpower requirement on rig floor to apply pipe dope—allowing "automatic rig" operation;
No time lost in make-up/break-out; and
Applicable to any type of threaded connection.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A process for manufacturing tubular components including a pin having an external threaded portion and a box having an internal threaded portion, the manufactured tubular components including the pin and box are capable of forming a threaded connection having effective galling resistance without application of pipe dope when in service, the manufacturing process steps comprising:
   joining the pin and box to opposite ends of a pipe section to form a tubular component;
   applying a lubricant on the threaded portion of at least one of the pin and box which have been prepared by machining the threaded portions;
   making up the threaded connection by threadably engaging the pin threaded portion of one tubular component to the box threaded portion of another tubular component to a recommended make-up torque for the threaded connection according to the American Petroleum Institute and breaking out the threaded connection, wherein the making up and breaking out step with lubricant applied on the threaded portion of at least one of the pin and box is performed a plurality of times inducing plastic deformation; and
   case hardening the threaded portion of at least one of the pin and box after performing the step of making up and breaking out a plurality of times.

2. The manufacturing process of claim 1, wherein the lubricant is compound grease.

3. The manufacturing process of claim 1, wherein the threaded portion of the box is a cut thread.

4. The manufacturing process of claim 1, wherein the threaded portion of the pin is a cut thread.

5. The manufacturing process of claim 1, wherein the threaded portion of only one of the pin and box is case hardened.

6. The manufacturing process of claim 1, wherein the case hardened threaded portion has a surface hardness that is minimally about 200-260 Brinell hardness points greater than the surface hardness of the threaded portion of the other mating pin or box.

7. The manufacturing process of claim 1, wherein the step of making up and breaking out the threaded connection is made up and broken out with lubricant 3 to 15 times.

8. The manufacturing process of claim 1, wherein the step of making up and breaking out the threaded connection is made up and broken out with lubricant 5 to 12 times.

9. The manufacturing process of claim 1, wherein the step of making up and breaking out the threaded connection is made up and broken out with lubricant 6 to 10 times.

10. A high galling resistant threadable joint of a pin having an external threaded portion and a box having an internal threaded portion prepared in accordance with the process of claim 1.

11. A process for manufacturing galling-resistant threaded tubular components for drilling hydrocarbon wells, the steps comprising:
   machining a threaded zone on an external peripheral surface at an end of a pin;
   machining a threaded zone on an internal peripheral surface at an end of a box;
   applying a lubricant on the threaded zone of at least one of the pin and box;
   making up a threaded connection by threadably engaging the threaded zone of the pin with the threaded zone of the box to substantially the current recommended make-up torque according to the American Petroleum Institute and breaking out the threaded connection, wherein the making up and breaking out step with lubricant applied on the threaded zone of at least one of the pin and box is performed a plurality of times; and
   case hardening the threaded zone of at least one of the pin and box after performing the step of making up and breaking out a plurality of times,
   wherein the manufacturing process produces threaded tubular components for subsequent field use in drilling hydrocarbon wells, the threaded tubular components adapted to form a threaded connection in the field having effective galling resistance without the use of a lubricant when in service.

12. The manufacturing process of claim 11, wherein the lubricant is compound grease.

13. The manufacturing process of claim 12, wherein the step of producing a threaded zone of the box is performed by cutting a thread.

14. The manufacturing process of claim 12, wherein the step of producing a threaded zone of the pin is performed by cutting a thread.

15. The manufacturing process of claim 11, wherein the threaded zone of only one of the pin and box is case hardened.

16. The manufacturing process of claim 15, wherein the case hardened threaded zone has a surface hardness that is minimally about 200-260 Brinell hardness points greater than the surface hardness of the threaded zone of the other mating pin or box.

17. The manufacturing process of claim 11, wherein the step of making up and breaking out the threaded connection is made up and broken out with lubricant 5 to 12 times.

18. The manufacturing process of claim 11, wherein the step of making up and breaking out the threaded connection is made up and broken out with lubricant 6 to 10 times.

19. A galling resistant threaded joint of tubular components for drilling or operating hydrocarbon wells, the threaded joint comprising a pin tubular component having an external threaded zone threaded to a box tubular component having an internal threaded zone without applying a lubricating grease, the pin and box tubular components manufactured in accordance with the process of claim 11.

20. A process for manufacturing galling-resistant threaded tubular components to be used as drill pipe for drilling hydrocarbon wells, comprising the steps of:
   forming a pin having an external threaded portion and a box having an internal threaded portion;
   applying a lubricant on the threaded portion of at least one of the pin and box;
   making a threaded connection by threadably engaging the threaded portions of the pin and box to a recommended make-up torque according to the American Petroleum Institute (API) and breaking out the threaded connection a plurality of times, wherein the making up and breaking out steps includes applying lubricant on the threaded portion of at least one of the pin and box;
   case hardening the threaded portion of one of the pin and box after performing the step of making up and breaking out a plurality of times; and
   joining one pin and one box to a pipe section to form a tubular component,
   wherein multiple threaded tubular components, manufactured according to the preceding steps, can be assembled end to end to produce a string of tubular components in which each connected pin to box is made without pipe dope or other coatings interposed between or on the threaded portions of the connected pins and boxes.

* * * * *